(12) United States Patent
Zondervan

(10) Patent No.: US 7,076,241 B1
(45) Date of Patent: Jul. 11, 2006

(54) SYSTEM AND METHOD FOR SELECTIVELY TRANSMITTING ELECTRONIC MESSAGES

(75) Inventor: Quinton Yves Zondervan, Boston, MA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/481,511

(22) Filed: Jan. 12, 2000

Related U.S. Application Data

(60) Provisional application No. 60/116,064, filed on Jan. 15, 1999.

(51) Int. Cl.
*H04Q 7/20* (2006.01)
*H04Q 7/38* (2006.01)

(52) U.S. Cl. ............... 455/412.1; 455/414.1; 455/414.4; 455/403; 455/412.2; 455/422.1; 455/466; 379/100.08; 709/218; 709/219; 709/228

(58) Field of Classification Search ......... 455/412, 455/403, 422, 426, 424, 425, 556, 550, 458, 455/517, 414.1, 414.3, 414.4, 422.1, 426.1, 455/426.2, 466, 550.1, 556.1, 556.2, 557, 455/412.1, 412.2, 418, 419, 420, 500, 73; 709/232, 206, 201, 203, 218, 219, 213, 214, 709/228; 379/93.08, 100.08, 100.09; 358/402, 358/403, 468

See application file for complete search history.

(56) References Cited

U.S. PATENT DOCUMENTS

| | | | |
|---|---|---|---|
| 5,396,537 A | 3/1995 | Schwendeman | 379/57 |
| 5,479,408 A | 12/1995 | Will | 370/94.1 |
| 5,550,861 A | 8/1996 | Chan et al. | 375/222 |
| 5,561,703 A | 10/1996 | Arledge et al. | 379/57 |
| 5,675,507 A | 10/1997 | Bobo, II | 364/514 |
| 5,742,905 A | 4/1998 | Pepe et al. | 455/461 |
| 5,745,689 A | 4/1998 | Yeager et al. | 395/200.36 |
| 5,758,088 A | 5/1998 | Bezaire et al. | 395/200.62 |
| 5,781,857 A | 7/1998 | Hwang et al. | 455/412 |
| 5,796,394 A | 8/1998 | Wicks et al. | 345/329 |
| 5,822,692 A | 10/1998 | Krishan et al. | 455/419 |
| 5,905,777 A * | 5/1999 | Foladare et al. | 379/90.01 |

(Continued)

*Primary Examiner*—William Trost
*Assistant Examiner*—Keith T. Ferguson
(74) *Attorney, Agent, or Firm*—Pillsbury Winthrop Shaw Pittman LLP

(57) ABSTRACT

A client/server based system provides an integrated messages system for a user having access to accounts on a number of different terminal communication devices, including at least one wireless terminal device. In a preferred embodiment, the system includes an agent that selectively transmits messages addressed to a particular user to at least one terminal device. The agent is connected to a wireless communications server and is adapted to receive and distribute messages, such as e-mail, from and to a multiplicity of senders and recipients, such as terminal devices interconnected over a network. Messages received from a terminal device and intended for a user may be forwarded to the user by the agent via a wireless communications server and wireless terminal device. The system enables the user to receive the incoming message and to reply to such a message or to generate an original message. Upon receiving a reply or original message, the agent, based upon certain information received from the user or upon a profile, processes the reply or original message received from the wireless communications server and forwards such message to one or more recipients in the form of a standard communications application whereby the recipient is presented with a message that appears to have come from a typical terminal device rather than from a wireless device.

25 Claims, 3 Drawing Sheets

U.S. PATENT DOCUMENTS

| | | | |
|---|---|---|---|
| 6,101,320 A * | 8/2000 | Schuetze et al. | 709/206 |
| 6,138,146 A * | 10/2000 | Moon et al. | 709/206 |
| 6,185,288 B1 * | 2/2001 | Wong | 455/426.1 |
| 6,185,604 B1 * | 2/2001 | Sekiguchi | 709/206 |
| 6,216,165 B1 * | 4/2001 | Woltz et al. | 709/232 |
| 6,223,213 B1 | 4/2001 | Cleron et al. | 709/206 |
| 6,263,201 B1 * | 7/2001 | Hashimoto et al. | 455/403 |
| 6,401,113 B1 * | 6/2002 | Lazaridis et al. | 455/556 |
| 6,463,464 B1 * | 10/2002 | Lazaridis et al. | |
| 6,732,273 B1 * | 5/2004 | Byers | 713/193 |

* cited by examiner

SYSTEM AND METHOD FOR SELECTIVELY TRANSMITTING ELECTRONIC MESSAGES

RELATED APPLICATIONS

This application claims priority based on U.S. Provisional Patent Application Ser. No. 60/116,064, entitled "Managing Electronic Mail and Other Communications from a Two-Way Wireless Device," filed Jan. 15, 1999. This application is also related to co-pending U.S. Patent Applications entitled, "System and Method for Formatting an Electronic Messages," filed herewith.

FIELD OF THE INVENTION

The invention relates generally to systems for transmitting information between terminal communication devices and particularly to a system for transmitting information between at least two terminal communication devices when at least one of the terminal devices is a wireless terminal device.

BACKGROUND OF THE INVENTION

More and more users increasingly depend on messaging services and electronic and wireless communications which utilize various and divergent formats as well as different devices, e.g., computer, facsimile, voice mail, electronic mail, mobile or cellular phone, pager, personal digital assistant ("PDA"), etc. Further, a growing number of users utilize multiple such messaging and communication services in what have become known as "mobile offices." Many users have access to numerous services via desktop computers interconnected to one or more wireline networks and also use wireless devices such as pager devices and mobile phones to conduct business. Typically, separate accounts and access profiles are required for each of the various messaging and communication services making it difficult and time consuming for users to communicate across the different messaging and communication services.

Users utilizing different messaging and communication services, when not physically present at each of the receiving devices, must frequently check the various services to determine if messages or other communications have been received. Often users may not have within their possession a mechanism that enables them to monitor or determine the receipt of a message or communication. For example, when a user is away from a desktop computer which receives e-mail messages from a server and the user does not have remote access to such messages, it may not be possible for the user to check even the existence of such messages without involving a third party to directly check for such messages. If such a third party is not available, then the user is left with few, if any, options short of physically returning to the desktop computer to check for such messages. Even when the user has access to the messages, such as via a laptop computer connected via modem to a network connecting the server to the desktop computer, then the user must check each of the services frequently or run the risk of missing an urgent communication.

Once the user receives notice of the message or communication, the user must then decide how best to act on the message or communication. If, as in the case of the e-mail message, the user does not have the benefit of a laptop or prefers not to be encumbered by such a device when away from the office, then the user must respond by telephone or some other different mechanisms or must involve a third party to prepare a response on behalf of the user. Accordingly, much of the benefit of having multiple forms of messaging and communicating is lost or rendered ineffective.

These and other drawbacks exist with existing systems.

SUMMARY OF THE INVENTION

One object of the invention is to provide integrated messaging across multiple different devices, e.g., desktop computer, pager, mobile or cell phone, PDA, etc.

Another object of the invention is to provide an integrating messaging platform whereby the device address is hidden so that it need not be revealed directly.

Another object of the invention is to provide a system that enables summarizing of e-mail messages so as to save air-time and cost.

According to these and other objects the present invention provides a seamless distribution of messages to and from recipients and senders utilizing different communication devices. In one embodiment, a sender sends an e-mail message to a recipient via a standard e-mail system, a server embodying various features of the present invention acts based on instructions received from the intended recipient and translates the e-mail message, or composes a message therefrom, in accordance with further instructions (such as generating a summary of the e-mail message) and forwards the translated message to the recipients' two-way pager device where the message is ultimately received. The recipient may then, utilizing the two-way wireless terminal device, respond to the message by forwarding a reply message to the sender, forwarding the original message to one or more third parties, delete the message, store the message, or take some other action.

Should the recipient elect to forward a reply message to the sender directly from the two-way terminal device, a server of the present invention receives the reply and modifies that reply. For example, the system may add a header, a footer, and page formatting in accordance with a template residing on the server. The original sender, now the reply recipient, receives the reply message. This reply message now has the appearance of having come directly from a typical e-mail transmitting device, such as a computer terminal, rather than having come from a wireless terminal device, such as a pager.

The present invention provides users with small communication enabled devices, such as two-way pagers and the like, the ability to send and receive e-mail without having to maintain a separate e-mail account and inbox specific to that device.

In one embodiment of the present invention, a two-way pager device is provided that is capable of reading/writing and replying to e-mail received in a desktop mail application. Further, by creating and storing a profile for the user, the user may predetermine which types of messages are to be sent to or summarized for the pager device automatically as they are received by the e-mail system. Replies and originating e-mail messages sent from the pager device are routed through the e-mail application to thereby appear like any other e-mail message. Recipients, therefore, cannot detect that the message was composed on or sent from a pager device. This gives the appearance that the replying or sending party is sending the message directly from the desktop computer. The e-mail server may comprise a web server that provides direct mail capabilities or any other electronic mail server.

In addition, many users receive updated information from on-line services, often in the form of e-mail messages. By employing the method and system of the present invention, a user may receive such updated information in a most timely fashion whether such individual is physically operating a desktop computer or at some remote location via the pager device.

An additional aspect of the present invention is the ability to use or provide activity monitoring to determine the current status of the user. For example, the system monitors usage of the user's desktop computer to determine if the user is presently situated at the desktop computer. If the system determines that the user is situated at the desktop, then some form of notification may be given to the user that an incoming e-mail has been received. If the system determines that the user is not situated at the desktop, then it may send the e-mail message, either complete or in some summary form, to the user's wireless terminal device. The user may be provided with the option of selecting the particular mode of operation, e.g., in office, out of office, etc. By selecting a particular mode of operation, the system forwards messages in accordance with the user's instructions based upon, for instance, a profile established by the user.

According to one embodiment of the invention, the integrated messaging system provides a server including an e-mail server, an e-mail database, and a scripting agent. The server operates in a computer network system including a sending client, a receiving client, a pager server, and a pager device. In one mode of operation, the sending client sends a message, such as an e-mail message, to the server, the e-mail server receives the message and places it in the e-mail database. The scripting agent accesses the message stored in the e-mail database and processes the message based on predetermined instructions. Such instructions may be based on a user profile or a receiving client profile. Based on the instructions, the scripting agent then forwards the processed message on to the pager server for forwarding to the user via the pager device. The scripting agent receives a reply to the received message from the pager device and formats the reply message to match the format of the received message. The server forwards the reply message to the sending client.

The sending client and/or the receiving client may be a desktop computer and may be connected via a network, such as the World Wide Web, the Internet, an intranet, or any other such network. In processing the received message, the scripting agent may compose a summary of the complete e-mail message before forwarding the summarized message to the pager server. The server also may forward a reply message to clients other than the sending client.

According to another embodiment of the invention, the integrated messaging system provides a client having a web browser with direct mail capability and being connected to a web server and to a pager server. The web browser including a scripting agent for processing e-mail messages received by the client via the web browser based on instructions, such as a user profile.

The client may be a desktop computer and may be connected to recipients via a network, such as the World Wide Web, the Internet, an intranet, or any other such network. In processing the received message, the scripting agent may compose a summary of the complete e-mail message before forwarding the summarized message to the pager server. The server also may include means for forwarding a reply message to multiple recipients.

Other objects, features and advantages of the present invention will be apparent from reviewing the detailed description and drawings of the present invention set forth herein.

DETAILED DESCRIPTION OF THE PREFERRED EMBODIMENTS

Figure 1:
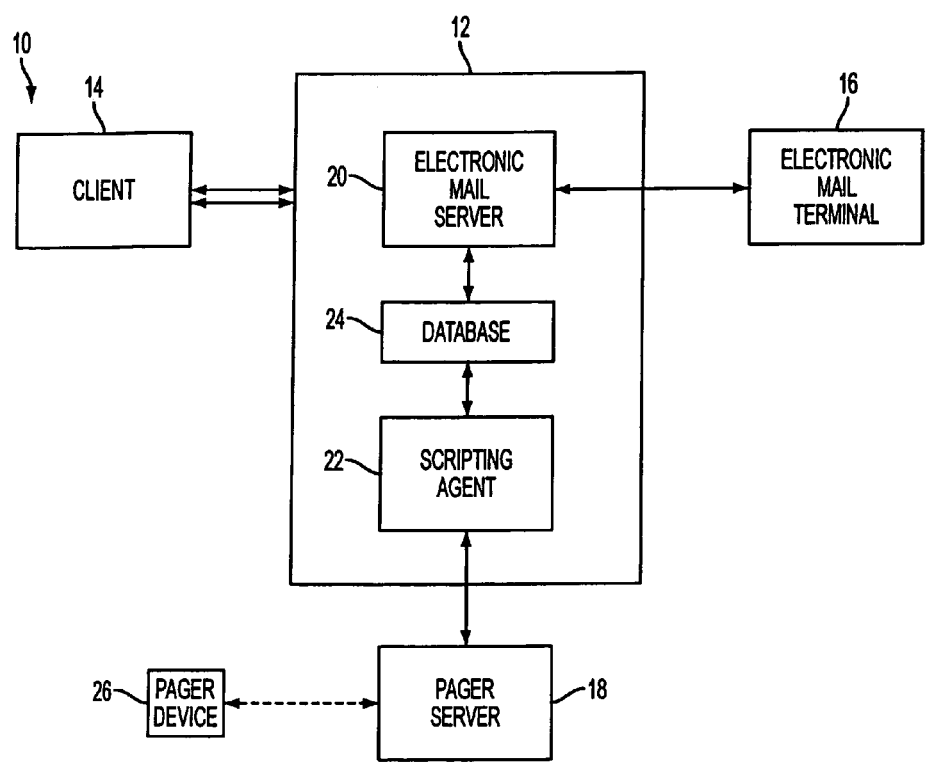
FIG. 1 is a block diagram illustrating an integrated messaging system in accordance with an embodiment of the present invention.

As schematically illustrated in the block diagram of FIG. 1, a first embodiment of the invention, integrated messaging system 10 provides server 12 interconnected with client 14, electronic mail terminal 16, and pager server 18. Server 12 includes e-mail server 20 and scripting agent 22, which share database 24. Client 14 and e-mail terminal 16 may be computer systems operated by users. One or more clients 14 and/or e-mail terminals 16 may be connected via a network, such as the World Wide Web, the Internet, an intranet, or any other such network. Server 12 is connected to pager server 18, whereby electronic messages processed by scripting agent 22 are forwarded to one or more users via one or more pagers devices 26. The electronic messages are preferably text-based files, but it is understood that any multimedia file may be used with the present invention. For example, a user could respond to an email message with a WAV file format electronic message.

Pager device 26 is a two-way communication device capable of both receiving and sending information to and from pager server 18 and ultimately scripting agent 22. Although the description herein relates to a paging system, the present invention also may be utilized in a system involving a cellular phone server and a cellular phone or other such mobile based communication system.

Scripting agent 22, as discussed in more detail below, is adapted to process and format message information received from pager device 26 so that when the message information is forwarded to one or more recipients, such as e-mail terminal 16, the recipients are unable to detect that the message was generated from a pager device rather than from a desktop computer, such as client 14, or other terminal. In this manner, integrated messaging system 10 provides a seamless distribution of messages and other communications, such as typical e-mail applications, across different messaging and communication systems and devices.

In one embodiment, a user profile is integrated into the formatting process. Specifically, a scripting agent 22 formats a message both in accordance with the formatting requirements of the receiving terminal and in accordance with the user profile. For example, a user profile may indicate a heading and signature block to automatically attach to all messages which originate from a pager device 26.

Figure 2:
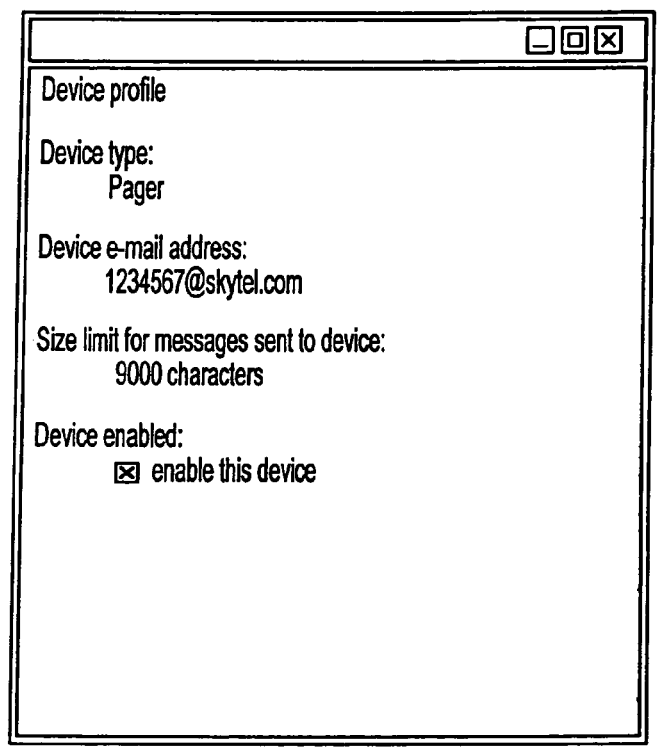
FIG. 2 is a diagram of a user profile, in one form, associated with the present invention.

In one mode of operation, a sending party or client via e-mail terminal 16 sends a message, such as an e-mail message generated by using a desktop mail application like Lotus Notes™, to server 12, e-mail server 20 receives the message and it is placed in e-mail database 24. Scripting agent 22 accesses the message stored in the e-mail database and processes the message based on predetermined instructions, such instructions may be at least in part based on a profile of the user/receiving client as described below with respect to FIG. 2. Based on the instructions, scripting agent 22 forwards the processed message on to pager server 18 for forwarding to one or more users via one or more pager devices 26. Agent 22 includes a module that receives a reply to the received message from pager device 18 and a module that formats the reply message to match the format of the received message. Server 12 includes a module that forwards the reply message to the originator of the initial message, the sending client via e-mail terminal 16. The sending client thereby becomes the reply message recipient. Scripting agent 22 may comprise a LotusScrip™ agent, although other suitable variations include executable code written in Java, C++, or any other programming or scripting language.

In addition, a user may utilize pager device 26 to initiate a message, such as an e-mail message, directly from the pager device to a recipient, such as via e-mail terminal 16. Many pager devices now include a full alpha-numeric keypad and many cellular or mobile phones likewise include keypads capable of inputting complete alpha-numeric character sets. Such capabilities enhance the effectiveness of a pager device in this application. Based upon a profile residing in, or at least accessible by, scripting agent 22, or based upon information input directly by the user via the pager device, scripting agent 22 processes the message received from the user via the pager device before sending such message on to the one or more intended recipients.

For example, to present the recipient with the appearance of the message having originated from a desktop computer utilizing a standard e-mail application, the scripting agent processes the informational message received from the pager device and formats the message in accordance with an e-mail application, such as Lotus Notes™. For instance, the message may be presented having separate fields for sender, copy line, recipient, brief description of subject matter of the message, date and time, body of the text of the message, etc. Also, rather than the user having to separately access the e-mail application by providing account, password, etc., the scripting agent effectively accomplishes such tasks by taking the message directly from the pager device and forwarding the message on to a recipient via the e-mail server, for example. Much of the necessary information may be provided in the user profile or the user may define recipient profiles for a plurality of persons the user typically exchanges communications with. Also, a company may provide a bank of such individual profiles for employees, contractors, customers, clients, etc., that may be accessed by multiple users for use with the integrated messaging system described herein.

In processing a received message, whether it be a message originating from e-mail terminal 16 or pager device 26 or a reply message from pager device 26, scripting agent 22 may compose a summary of the complete e-mail message before forwarding the summarized message to pager server 18 or to e-mail server 20. The decision as to whether to forward a complete message or a summarized version of the complete message may be in whole or in part based upon a profile available to the agent. There are known methods and programs for summarizing messages, some of which prioritize words based on predefined terms, based on the number of times the words appear in the message, based on user defined rules, etc. The present invention may utilize such known summarizing methods as well as methods that will be available in the future. The scripting agent may also comprise a module that processes requests to expand summaries of messages, including summarized messages composed by the user on the pager device. The scripting agent, based on instructions from the user, may forward a reply message to recipients other than the original sending client and may provide the user with information concerning delivery, receipt and opening of messages by recipients.

The integrated messaging system of the present invention may permit users to: define the types of messages to be forwarded by the agent to the pager server; create an exclusive list of clients or persons from whom they wish to receive messages via the pager server or otherwise exclude forwarding of messages from certain individuals; access a portion, such as identifying fields, or all of a message from the pager device rather than having such messages automatically forwarded by the agent; define a threshold message size, e.g., by the number of characters, beyond which a message while be summarized and/or truncated; create a list of individuals from whom complete messages are to be received, i.e., no summarizing and/or truncating of messages sent by specified individuals; and retrieve complete messages that have been truncated or summarized by the agent.

An additional function that may be included in integrated messaging system 10 is the ability to provide activity monitoring to determine the current status of a user. For example, the system may monitor usage of the user's desktop computer to determine if the user is presently situated at the desktop computer or may utilize a physical monitoring device to determine the presence of the user or input to a monitoring function. If the system determines that the user is situated at the desktop, then some form of notification may be given to the user that an incoming e-mail has been received at the desktop. The system may determine that a user is at the desktop by monitoring the desktop computer and determining whether the user takes an action or not. Other methods for determining whether the user is at his desktop may also be used.

If the system determines that the user is not situated at the desktop, then it may send the e-mail message, either complete or in some summary form, to the user's pager device 26. It is additionally contemplated that if an electronic message is delivered to the desktop and the electronic message remains unread for a predetermined period of time, the scripting agent can transmit the electronic message to the pager in accordance with the user profile. The user may be provided with the option of selecting the particular mode of operation, e.g., in office, out of office, etc. By selecting a particular mode of operation, the system will forward messages in accordance with the user's instructions based upon, for instance, a user profile.

In a patent application previously filed and pending with the U.S. Patent Office, entitled Web Server With Direct Mail Capability and having been assigned Ser. No. 09/100,130, which is incorporated herein by reference, a method and system is disclosed which enables a web server to provide direct mail capabilities from a web browser. Also, the invention enables a web server to provide direct mail capabilities from a web browser without having to open another mail application or viewer window. In particular, the application discloses a system comprising a novel web server for a client/server network, where the client side is equipped with a standard browser. The server comprises standard web server functionality (e.g., HTTP server), an HTML translator, a server side software (e.g., Lotus Notes™ server software) and a database (e.g., a Lotus Notes™ database). Significantly, the database does not need HTML files. Preferably, the server receives a URL-based request from a browser via HTTP, the HTTP server and HTML translator determine the object (e.g., documents or databases) specified by the URL, retrieves that object, translates that object to HTML format and sends the HTML downloaded object to the client side browser for display. Also, the application discloses the server comprising an integrated mail application which provides a web browser with direct mail capabilities. The system enables the server to provide electronic mail capabilities directly within a browser window without having to open another mail application or display window.

Figure 3:
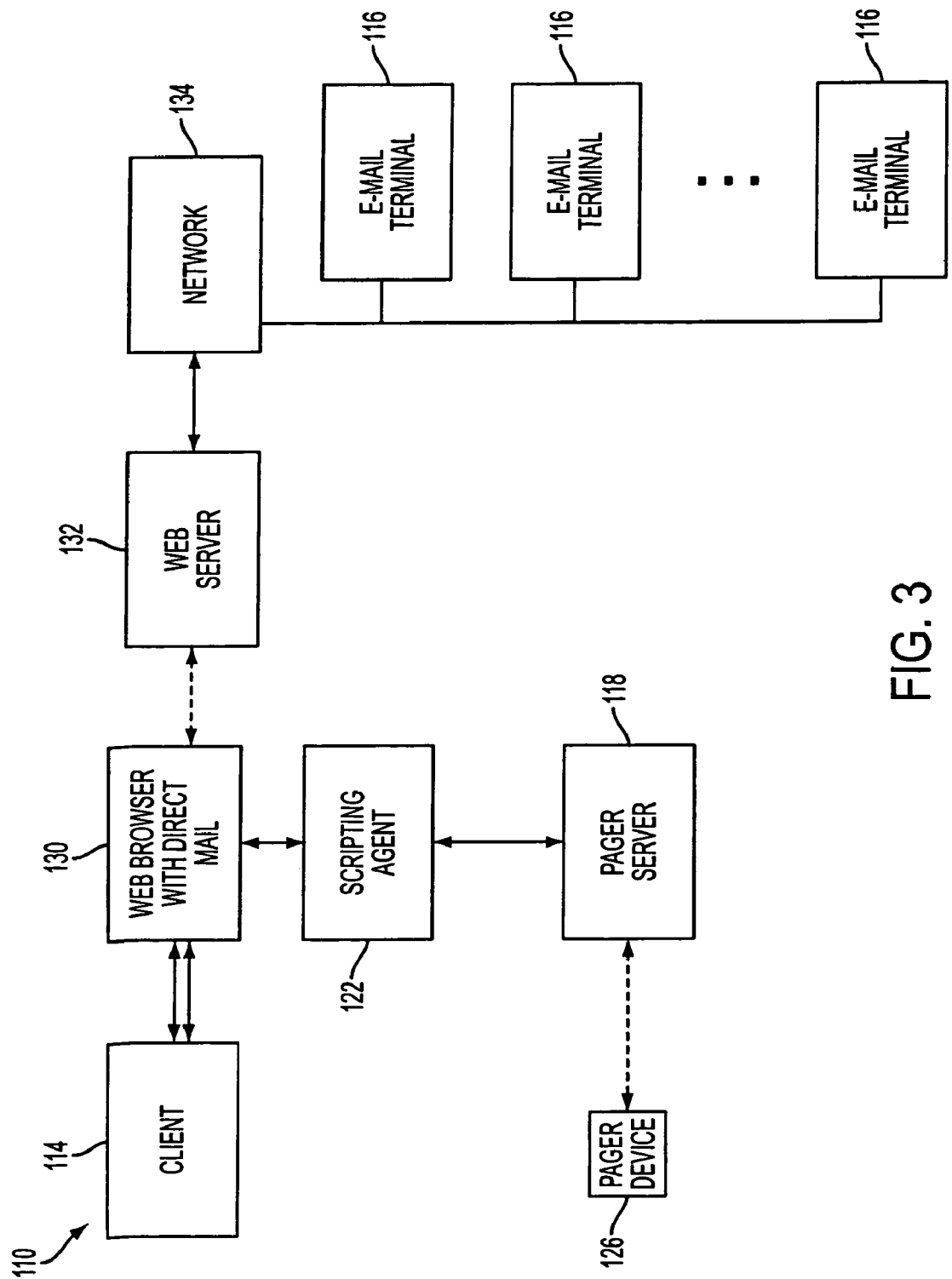
FIG. 3 is a block diagram illustrating an integrated messaging system in accordance with another embodiment of the present invention.

According to another embodiment of the invention, as shown in FIG. 3, integrated messaging system 110 provides a client, 114, having web browser 130 with direct mail capability resident therein and being connected to web server 132 and to pager server 118. Web browser 130 includes agent 122 for processing e-mail messages, such as received by client 114 via web server 132, based on instructions, such as a user profile. A scripting agent 122 may be provided for implementing the functions as described above for scripting agent 22.

As described above, pager server 118 communicates messages between pager device 126 and scripting agent 122. Pager device 126 messages and generates reply messages and/or originating messages. Scripting agent 122 receives reply or originating messages from the pager device and formats the reply and originating messages to match one or more e-mail message formats. The agent may fashion the message to appear as originating from different e-mail applications when the message is being forwarded to multiple recipients operation on different e-mail applications. Such information may be resident in recipient profiles, received directly from the user, or recognized by the scripting agent in receiving an originating message from the e-mail server, as in FIG. 1, or from web browser 130. Web browser 130 may forward reply and originating messages to recipients at e-mail terminals 116 via web server 132 over network 134.

In the integrated mail application associated with web browser 130, a user may read, create, edit, etc., electronic mail messages received via web server 132. The messaging function is performed directly through web browser 130. A separate window or application does not need to be opened at client 114.

In one form, server 132 supports major industry messaging protocols and Application Programmer's Interfaces (APIs). It provides a backbone messaging platform with robust message transfer agents (MTAs) including SMTP, X.400, cc:Mail, and Notes Mail. Messaging services support e-mail clients using industry standards, including Post Office Protocol v3 (POP3) and Internet Mail Access Protocol v4 (IMAP4). Also, the server supports other broadly deployed protocols, including Vendor Independent Mail (VIM), and Messaging API (MAPI).

Besides the e-mail application described herein, the present invention also could be utilized to access group calendaring and scheduling applications via agent 22/122. In the event a user has a particular event on a calendar application with an alarm that engages at a predetermined time, then the integrated messaging system of the present invention operates to forward messaging relating to the alarm via agent 22/122 and pager server 18/118. Likewise, should a user desire to access the calendaring program, the integrated messaging system may perform this function essentially as described above. Scripting agent 22/122 may then be provided with a module that accesses such a calendaring application and composes a message for forwarding to the pager device.

The embodiments disclosed herein are by way of example only and the present invention is not limited thereto. Other embodiments and uses of the invention will be apparent to those skilled in the art from consideration of the specification and practice of the invention disclosed herein. The specification and examples should be considered exemplary only.

What is claimed is:

1. An integrated messaging system comprising:
at least two terminal devices associated with a common user comprising a first terminal device and a second terminal device, wherein at least the second terminal device is a wireless terminal device;
a server capable of routing electronic messages and of receiving at least one electronic message addressed to the first terminal device and of determining if a size of the electronic message exceeds a threshold size;
a database that stores at least one electronic message addressed to the first terminal device; and
at least one scripting agent that accesses the database, retrieves the electronic message addressed to the first terminal device stored on the database, and processes the electronic message for transmission to the second terminal device, wherein a summary of the electronic message addressed to the first terminal device is created if the size of the electronic message exceeds the threshold size.

2. The integrated messaging system of claim 1 further comprising a physical monitoring device to monitor a status of the common user.

3. The integrated messaging system of claim 2 wherein the status of the common user comprises a level of user activity at the first terminal device.

4. The integrated messaging system of claim 1 wherein the electronic message is retrieved by the scripting agent after a passage of a predetermined amount of time during which the electronic message has not been opened at the first terminal device.

5. The integrated messaging system of claim 1 wherein the scripting agent retrieves the electronic message upon a determination of substantially no user activity at the first terminal device.

6. The integrated messaging system of claim 1 wherein the scripting agent creates the summary of the electronic message and causes the summary to be transmitted for transmission to the wireless second terminal device in accordance with a user profile.

7. The integrated messaging system of claim 6, wherein the scripting agent retrieves the electronic message upon receiving a request for the electronic message from the wireless terminal device.

8. A method for managing communications between at least two terminal devices associated with a common user comprising a first terminal device and a second terminal device, wherein at least the second terminal device is a wireless terminal device, the communication management method comprising:
receiving an electronic message addressed to the first terminal device;
determining if a size of the electronic message exceeds a threshold size;
storing the electronic message in a database;
accessing the database with a scripting agent to retrieve the electronic message;

processing the electronic message with the scripting agent for transmission to the second terminal device;

creating a summary of the electronic message if the size of the electronic message exceeds the threshold size; and transmitting the processed electronic message to the wireless second terminal device.

9. The communications management method of claim 8, further comprising monitoring a status of the common user.

10. The communications management method of claim 9, wherein the status comprises a level of user activity at the first terminal device.

11. The communications management method of claim 8 further comprising:

holding the electronic message in the database for a predetermined amount of time during which the electronic message has not been opened at the first terminal device; and enabling the scripting agent to access the database after the predetermined amount of time to retrieve the electronic message.

12. The communications management method of claim 8 wherein accessing the database with the scripting agent comprises accessing the database with the scripting agent to retrieve the electronic message upon a determination of substantially no user activity at the first terminal device.

13. The communication management method of claim 8 wherein the summary of the electronic message for transmission to the wireless terminal device is created in accordance with a user profile.

14. An integrated messaging system comprising:

at least two terminal devices associated with a common user comprising a first terminal device and a second terminal device, wherein at least the second terminal device is a wireless terminal device;

a server that routes electronic messages and is capable of receiving at least one electronic message addressed to the first terminal device and of determining if a size of the electronic message exceeds a threshold size; and a scripting agent that processes the electronic message addressed to the first terminal device for transmission to the second terminal device by creating a summary of the electronic message addressed to the first terminal device if the size of the electronic message exceeds the threshold size.

15. The integrated messaging system of claim 14 further comprising a physical monitoring device to monitor a status of the common user.

16. The integrated messaging system of claim 15 wherein the status of the common user comprises a level of user activity.

17. The integrated messaging system of claim 14 wherein the electronic message addressed to the first terminal device is processed by the scripting agent after a passage of a predetermined amount of time during which the electronic message has not been opened.

18. The integrated messaging system of claim 14 wherein the scripting agent processes the electronic message addressed to the first terminal device upon a determination of substantially no user activity at the first terminal device.

19. The system of claim 14, wherein the scripting agent creates the summary of the electronic message addressed to the first terminal device based on a user profile.

20. The system of claim 14, wherein the scripting agent creates the summary of the electronic message addressed to the first terminal device based on at least one of a prioritization of words based on predefined terms, a number of times words appear in the electronic message, and user defined rules.

21. The system of claim 14, wherein the threshold size includes a number of characters.

22. A method of managing communications between at least two terminal devices associated with a common user comprising a first terminal device and a second terminal device, wherein at least the second terminal device is a wireless terminal device, the communication management method comprising:

receiving an electronic message addressed to the first terminal device;

determining if a size of the electronic message exceeds a threshold size;

processing the electronic message with a scripting agent for transmission to the second terminal device by creating a summary of the electronic message if the size of the electronic message exceeds the threshold size; and transmitting the summarized electronic message to the second terminal device.

23. The method of claim 22, wherein the scripting agent creates the summary of the electronic message based on a user profile.

24. The method of claim 22, wherein the scripting agent creates the summary the electronic message based on at least one of a prioritization of words derived from predefined terms, a number of times words appear in the electronic message, and user defined rules.

25. The method of claim 22, wherein the threshold size includes a number of characters.

* * * * *